United States Patent [19]
Forster et al.

[11] 3,852,346
[45] Dec. 3, 1974

[54] PRODUCTION OF CARBOXYLIC ACID ANHYDRIDES

[75] Inventors: Denis Forster, University City; Arnold Hershman; Frank E. Paulik, both of Creve Coeur, all of Mo.

[73] Assignee: Monsanto Company, St. Louis, Mo.

[22] Filed: Dec. 26, 1972

[21] Appl. No.: 318,125

[52] U.S. Cl.............. 260/546, 252/472, 260/408, 260/413, 260/514 M, 260/515 R, 260/533 A, 260/539 R
[51] Int. Cl............................................. C07c 51/14
[58] Field of Search........................... 260/546, 413

[56] References Cited
UNITED STATES PATENTS

| | | | |
|---|---|---|---|
| 3,064,040 | 11/1962 | Klemchak | 260/413 |
| 3,579,551 | 5/1971 | Craddock et al. | 260/413 |
| 3,579,552 | 5/1971 | Craddock et al. | 260/413 |
| 3,637,833 | 1/1972 | Fenton | 260/413 |
| 3,641,074 | 2/1972 | Fenton | 260/410.9 |

OTHER PUBLICATIONS
Copenhauer, "Acetylene & Carbon Monoxide Chem.," (1949) p. 270, TP 767 C6.

Primary Examiner—James A. Patten
Assistant Examiner—Michael Shippen

[57] ABSTRACT

The present invention relates to an improved process for the preparation of organic carboxylic acid anhydrides, specifically by the reaction of ethylenically unsaturated compounds having 2 to 30 carbon atoms with carbon monoxide and carboxylic acids or substances which yield carboxylic acids under the reaction conditions, at a temperature of 50°C to 300°C and a partial pressure of carbon monoxide of from 1 to 2,000 psia. in the presence of a catalyst composition essentially comprised of 1. a rhodium or iridium compound, and
2. an iodide component subject to the conditions that the atomic ratio of iodide to rhodium or iridium is from 1:1 to 300:1,
3. a catalyst preserver or regenerator component selected from the group consisting of hydrogen or a compound capable of forming hydrogen under the reaction conditions.

The process is particularly suited to the production of propionic anhydride.

10 Claims, No Drawings

PRODUCTION OF CARBOXYLIC ACID ANHYDRIDES

This invention relates to an improved process for the production of carboxylic acid anhydrides. More particularly it relates to a process for the transformation of ethylenically unsaturated compounds having 2 to 30 carbon atoms and containing the structural unit

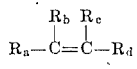

in aliphatic, acyclic, or cycloaliphatic form where $R_a$, $R_b$, $R_c$, and $R_d$ are moieties having from 0 to 20 carbon atoms and are selected from the group consisting of hydrogen, halogen, alkyl, alkene, aryl, cycloaryl, and cycloalkene moieties, which process comprises contacting the said compound with carbon monoxide and carboxylic acids or substances which can give carboxylic acids under the reaction conditions. More particularly the process improvement comprises producing carboxylic acid anhydrides in the presence of catalyst compositions essentially comprising rhodium or iridium compounds or complexes, an iodide component, and a catalyst preserving or regenerating component consisting essentially of hydrogen or a compound capable of giving rise to hydrogen under the reaction conditions to yield carboxylic acid anhydrides selectively and efficiently at mild pressures.

Processes for the preparation of carboxylic acid anhydrides from olefins, and other ethylenically unsaturated compounds, carbon monoxide, and carboxylic acids are well known in the art. The prior art teaches the use of a number of catalysts for the synthesis of carboxylic acid anhydrides by reaction of olefins with carbon monoxide and carboxylic acids at elevated temperatures and pressures. Catalysts such as acids, salts and carbonyls of nickel and cobalt, especially halides; and in general, the Group VIII metals, and simple salts, carbonyls and complexes have been reported to function for the production of carboxylic acid anhydrides by reaction of olefins and carbon monoxide in the presence of carboxylic acids or substances which yield carboxylic acids under the reaction conditions at temperatures from 130°C–375°C and pressures up to 1,000 atmospheres. However, even under such severe conditions the yields of acid anhydride were substantially poor, and therefore, uneconomical. Somewhat less severe reaction conditions of temperature and/or pressure have been reported in the literature employing specific catalyst compositions, e.g., 100°C– 300°C and 1 to 70 atmospheres in the presence of palladium phosphine complex catalysts.

Even using the prior art specific catalyst compositions and reaction conditions, substantially poorer yields of the desired carboxylic acid anhydride products and substantially slower reaction rates are obtained than those achieved in the process of this invention.

Certain disadvantages present in the carbonylation processes described in the prior art are catalyst instability, lack of product selectivity, low levels of catalyst reactivity, and high levels of halide promoter required. One particular disadvantage of olefin carbonylation processes of the prior art is their dependence upon the use of catalysts comprised of metal carbonyls or certain modified metal carbonyls including dicobalt octacarbonyl, iron carbonyl, and nickel carbonyl, all of which require the use of high partial pressures of carbon monoxide and/or high concentrations of halide promoter to remain stable under the necessarily high reaction temperatures employed. For example, dicobalt octacarbonyl requires partial pressures of carbon monoxide as high as 3,000 psig to 10,000 psig under normal carbonylation conditions of 175°C to 300°C.

Still another disadvantage of carbonylation processes for ethylenically unsaturated compounds disclosed in the prior art is their relatively low level of activity. This low level of activity requires higher catalyst concentrations, higher halogen concentrations, longer reaction times, and higher temperatures to obtain substantial reaction rates and conversions. Consequently, very large and costly processing equipment is required.

More recently, halide-promoted rhodium and iridium catalysts have been described for carboxylic acid synthesis from olefins, carbon monoxide, and water under mild reaction conditions. It is noted that there are certain conditions under which these same catalyst systems will also generate carboxylic acid anhydrides by reaction of olefins, carbon monoxide, and carboxylic acids. While these catalyst systems do indeed give reactivity at much milder conditions than the other prior art catalyst systems, nevertheless, these catalyst systems suffer from the disadvantage that under certain conditions their activity for anhydride synthesis diminishes and, in some cases, undergo almost complete deactivation. This deactivation may occur either during reaction or become apparent when the catalyst is recycled to the reactor after the product is distilled out. Thus, for commercial production of carboxylic acid anhydrides such systems give rise to numerous problems.

STATEMENT OF THE INVENTION

It is therefore an object of the present invention to overcome the above disadvantages and, thus, provide an improved and commercially feasible carbonylation process for the production of carboxylic acid anhydrides from ethylenically unsaturated compounds in liquid phase and vapor phase processes at low pressure. The process of this invention can be conducted in a batch or continuous operation.

Another object of this invention is to provide a more reactive and more stable carbonylation catalyst composition than has been heretofore described in the prior art.

Another object of the present invention is to provide a carbonylation catalyst composition which results in the production of a higher yield of the desired carboxylic acid anhydride with no substantial formation of ethers, aldehydes, ketones, lactones, carbon dioxide, alkanes, and other undesirable by-products.

In accordance with the present invention superior yields of carboxylic acid anhydride are obtained by reaction of ethylenically unsaturated compounds in the liquid phase or vapor phase with carbon monoxide and at least one of the reactants selected from the group of carboxylic acids and water at temperatures of about 50°C to 300°C, preferably 125°C to 225°C, and at partial pressures of carbon monoxide from 1 psia to 2000 psia, preferably 25 psia to 500 psia, although higher pressure may be employed, in the presence of an improved catalyst system, essentially comprising an iridium or rhodium component, an iodide component, and a catalyst preserving or regenerating component consisting of hydrogen or a compound capable of giving rise to hydrogen under the reaction conditions.

DESCRIPTION OF THE PREFERRED EMBODIMENTS

The following equation illustrates the reaction which takes place when carboxylic acid anhydrides are produced from ethylenically unsaturated compounds having 2 to 30 carbon atoms, carbon monoxide, and carboxylic acids of the formula RCOOH, where R represents alkyl, cycloalkyl, aryl or aralkyl groups;

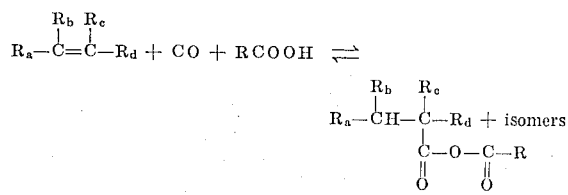

The ethylenically unsaturated reactant is an aliphatic, acyclic or cycloaliphatic form and $R_a$, $R_b$, $R_c$, and $R_d$ are moieties having from 0 to 20 carbon atoms and are selected from the group consisting of hydrogen, halogen, alkyl, alkene, aryl, cycloalkyl, and cycloalkene moieties.

Under certain reaction conditions, depending upon feedstocks and other parameters and isomeric mixed anhydride

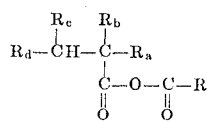

may also be produced. Simple anhydrides are formed to some extent by disproportionation of mixed anhydride products. For example, ethylene reacts with carbon monoxide and acetic acid to form the mixed acetic propionic anhydride $C_2H_5COOCOCH_3$, which then may disproportionate into propionic anhydride and acetic anhydride.

In a preferred embodiment ethylene reacts with carbon monoxide and propionic acid to form propionic anhydride in substantially the following manner:

$$C_2H_4 + CO + C_2H_5COOH = C_2H_5COOCOC_2H_5$$

In another embodiment of this invention the carboxylic acid which reacts with the olefin and carbon monoxide may be produced, at least in part, in situ, from substances which yield carboxylic acids under reaction conditions. Thus, the invention contemplates the synthesis of carboxylic acid anhydrides by introducing into a reaction vessel carbon monoxide, water, and ethylenically unsaturated compounds, in such quantities that the ethylenically unsaturated compounds and carbon monoxide are present in molar excess of the amount needed for conversion of all of the water to carboxylic acid at temperatures of 50°C to 300°C and a partial pressure of carbon monoxide of from 1 to 2,000 psia in the presence of a catalyst system essentially comprising critical proportions of a rhodium or iridium component, a halide component, and a catalyst preserving or regenerating component consisting of hydrogen or a compound capable of giving rise to hydrogen under the reaction condittions.

When the carboxylic acid reactant is produced in situ the overall reaction may be written as follows:

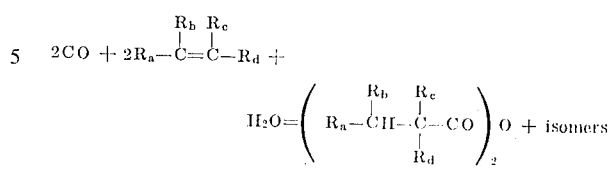

By control of the molar ratio of water to carbon monoxide, ethylenically unsaturated compounds and carboxylic acid (if desired) introduced into the reaction vessel, co-production of carboxylic acids and carboxylic acid anhydrides may be achieved. The criteria whether solely anhydride is produced or whether acid and anhydride are co-produced depends on $R_w$ which is the ratio of moles of water fed to the reactor per mole of carbon monoxide or olefin consumed (since carbon monoxide and the ethylenically unsaturated compounds are reacted in a 1 to 1 mole ratio, $R_w$ may be computed based on either of these reacting components). For values of $R_w \geq 1.0$ (equal to or greater than 1), no anhydride is formed; the products from the reactor are carboxylic acids. At values of $R_w >$ (greater than) 0.5 but $< 1.0$ (less than 1.0) carboxylic acid anhydrides and carboxylic acids are co-produced. Carboxylic acid anhydrides are the sole products when $R_w$ is 0.5. For values of $R_w < 0.5$ (less than 0.5), carboxylic acid must also be reacted from the feed to satisfy the relationship for anhydride synthesis through the equation.

| Moles of carboxylic acid consumed from the feed per mole of carbon monoxide consumed. | $= 1-(2 \times R_w)$ [for $R_w < 0.5$] |
|---|---|

For example, feeding 0.75 moles of water to the reactor for every 1 mole of ethylene or carbon monoxide consumed ($R_w = 0.75$) co-produces 0.5 moles of propionic acid along with 0.25 moles of propionic anhydride. However, feeding 0.5 moles of water to the reactor for every mole of ethylene or carbon monoxide consumed ($R_w = 0.50$) yields substantially all propionic anhydride, and feeding 0.4 moles of water ($R_w = 0.4$) requires the consumption of 0.2 mole of propionic acid from the feed to synthesize 1 mole of propionine anhydride.

The reaction may also be conducted in essentially two stages by contacting the ethylenically unsaturated compound with carbon monoxide and water to produce carboxylic acid in the first stage and then contacting the resulting carboxylic acid product with more ethylenically unsaturated compound and carbon monoxide to produce the required carboxylic acid anhydride. Operating in the above manner with two reaction zones or in an elongated, heated conduit with intermediate addition of reactants appears to be beneficial to the catalyst system which does not deactivate as readily.

In all the above cases, it has also been discovered that critical control of the ratio of halide to metal of the carbonylation catalyst system is necessary as discussed herein, in addition to the critical control of feed ratios to obtain the desired anhydride in good yield. Suitable ethylenically unsaturated feedstocks in the processes of this invention include ethylene, propylene, butene-1; butene-2; isopenetene, hexenes, octenes, dodecenes; hexadecenes; 2-methylpentene; styrene; methyl-styrene; vinylcyclohexene; 3,3-dimethyl-1-butene; 2-phenylbutene; 2-cyclohexybutene; and mixtures thereof.

In addition to the simple olefinic hydrocarbons, other feedstocks may also be used, such as nitrogen substituted compounds, e.g., acrylonitrile; carboxyl substituted compounds, e.g., vinyl acetic acid; halogen substituted compounds, e.g., vinyl chloride; and hydroxy substituted compounds, e.g., allyl alcohol.

However, the preferred feedstocks are mono-olefinic hydrocarbons, including alpha- and internal olefins, such as ethylene, propylene, butene-1, butene-2, isobutylene, hexene-1, hexene-2, dodecene-1, dodecene-6, 3,3-dimethylbutene-1, and the like, and most preferably ethylene.

Suitable carboxylic acid feedstocks in the process of this invention include acetic acid, propionic acid, heptanoic acids, tridecanoic acids, phenylacetic acid, toluic acid, 2-methyl valeric acid, and the like.

However, the preferred carboxylic acid feedstocks are low molecular weight saturated aliphatic carboxylic acids such as acetic acid and propionic acid.

Numerous organic carboxylic acid anhydrides are prepared by the process of this invention, such, for example, as the following: carbon monoxide reacting with propionic acid and ethylene gives propionic anhydride; carbon monoxide reacting with propylene and butyric acids gives butyric anhydrides; carbon monoxide reacting with isobutylene and 2-methylbutyric acid gives 2-methylbutyric anhydride; carbon monoxide reacting with dodecenes and tridecanoic acids gives tridecanoic anhydride, and the like.

The most preferred embodiments of the processes of this invention are the preparation of propionic anhydride from ethylene, and carbon monoxide, and propionic acid or water; and the preparation of the mixed acetic-propionic anhydride which disproportionats to acetic anhydride and propionic anhydride from ethylene, carbon monoxide, and acetic acid.

For purposes of the present invention, the catalyst system essentially includes a rhodium or iridium compound, an iodide component and a catalyst preserving or regenerating component consisting of hydrogen or a compound capable of giving rise to hydrogen under the reaction conditions.

Generally, the metal component of the catalyst system of the present invention is believed to be present in the form of a coordination compound of rhodium or iridium with a halogen component providing at least one of the ligands of such a coordination compound. In this invention, these coordination compounds also generally include carbon monoxide ligands. Other moieties may be present if desired. Generally, it is preferred that the catalyst system contain as a promoting component, an excess of halogen over that present as ligands in the coordination compound. The terms "coordination compound" and "coordination complex" used throughout this specification means a compound or complex formed by combination of one or more electronically poor molecules or atoms capable of independent existence with one or more electronically rich molecules or atoms, each of which may also be capable of independent existence, e.g., as a charged or neutral moiety including cations, anions, free radicals, neutral compounds, etc.

The essential metal and halogen components of the catalyst system of the present invention may be provided by introducing into the reaction zone a coordination compound of rhodium or iridium containing halogen ligands or may be provided by introducing into the reaction zone separately a metal compound and a halogen compound. Among the material which may be charged to the reaction zone to provide the metal component of the catalyst system of the present invention are rhodium or iridium metal, rhodium or iridium salts and oxides, organo rhodium or iridium compounds, coordination compounds of rhodium and iridium, and the like. Specific examples of materials capable of providing the metal constituent of the catalyst system of the present invention may be taken from the following non-limiting partial list of suitable materials. Chemical and/or physical treatment of the metal precursor may be desirable, in order to render the rhodium or iridium moiety in the proper valence state and ligand environment. A partial list of suitable metal compounds follows:

| | |
|---|---|
| Rh or Ir metal | $[(n-C_4H_9)_4N][Ir(CO)_2X_2]$ where X = Cl⁻, Br⁻, I⁻. |
| $RhCl_3$ or $IrCl_3$ | $[(n-C_4H_9)_4As]_2[Ir_2(CO)_2Y_4]$ where Y = Br⁻, I⁻. |
| $RhBr_3$ or $IrBr_3$ | $[(n-C_4H_9)_4P][Ir(CO)I_4]$. |
| $RhI_3$ or $IrI_3$ | $Rh[(C_6H_5)_3P]_2(CO)Br$ or $Ir[(C_6H_5)_3P]_2(CO)Br$. |
| $RhCl_3 \cdot 4H_2O$ or $IrCl_3 \cdot 4H_2O$ | $Rh[(n-C_4H_9)_3P]_2(CO)Br$ or $Ir[(n-C_4H_9)_3P]_2(CO)Br$. |
| $RhBr_3 \cdot 4H_2O$ or $IrBr_3 \cdot 4H_2O$ | $Rh[(n-C_4H_9)_3P]_2(CO)I$ or $Ir[(n-C_4H_9)_3P]_2(CO)I$. |
| $Rh(CO)_3Cl$ or $Ir(CO)_3Cl$ | $RhBr[(C_6H_5)_3P]_3$ or $IrBr[(C_6H_5)_3P]_3$. |
| $Rh(CO)_3Br$ or $Ir(CO)_3Br$ | $RhI[(C_6H_5)_3P]_3$ or $IrI[(C_6H_5)_3P]_3$. |
| $Rh_2(CO)_4I_2$ or $Ir_2(CO)_4I_2$ | $RhCl[(C_6H_5)_3P]_2$ or $IrCl[(C_6H_5)_3P]_2$. |
| $Rh_2(CO)_8$ or $Ir_2(CO)_8$ | $[(C_6H_5)_3P]_3Rh(CO)H$ or $[(C_6H_5)_3P]_3Ir(CO)H$. |
| $Rh[(C_6H_5)_3P]_2(CO)I$ or $Ir[(C_6H_5)_3P]_2(CO)I$ | $[Rh(C_2H_4)_2Cl]_2$ or $[Ir(C_2H_4)_2Cl]_2$. |
| $Rh[(C_6H_5)_3P]_2(CH_3I)I$ or $Ir[(C_6H_5)_3P]_2(CH_3I)I$ | $K_4Rh_2Cl_2(SnCl_3)_4$ or $K_4Ir_2Cl_2(SnCl_3)_4$. |
| $Rh(SnCl_3)[(C_6H_5)_3P]_3$ or $Ir(SnCl_3)[(C_6H_5)_3P]_3$ | $K_4Rh_2Br_2(SnBr_3)_4$ or $K_4Ir_2Br_2(SnBr_3)_4$. |
| $RhCl(CO)[(C_6H_5)_3As]_2$ or $IrCl(CO)[(C_6H_5)_3As]_2$ | $K_4Rh_2I_2(SnI_3)_4$ or $K_4Ir_2I_2(SnI_3)_4$. |
| $RhI(CO)[(C_6H_5)_3Sb]_2$ or $IrI(CO)[(C_6H_5)_3Sb]_2$ | $RhO_2$, $Rh_2O_3$ or $IrO_2$, $Ir_2O_3$. |
| $Rh[(C_6H_5)_3P]_2(CO)Cl$ or $Ir[(C_6H_5)_3P]_2(CO)Cl$ | $K_3Rh(NO_2)_6$ or $K_3Ir(NO_2)_6$. |
| $RhCl[(C_6H_5)_3P]_3H_2$ or $IrCl[(C_6H_5)_3P]_3H_2$ | $Rh(CO)_2\begin{bmatrix} CH_3-C=CH-C-CH_3 \\ -O \quad O \end{bmatrix}$ or $Ir(CO)_2\begin{bmatrix} CH_3-C=CH-C-CH_3 \\ -O \quad O \end{bmatrix}$. |

Chemical and/or physical treatment of the metal precursor may be desirable as discussed below, in order to render the rhodium or iridium moiety in the proper valence state and ligand environment. For example, rhodium complexes containing stable chelating ligands, such as triacetylacetonato rhodium (III), may be treated chemically to remove or destroy the bidentate chelate ligands in order that transformation to the proper valence state and monodentate ligand configuration can be accomplished.

Also in the presence of certain biphyllic ligands detrimental effects have been observed on reaction rate employing the rhodium or iridium/halide catalyst system for anhydride production. In contradistinction to other Group VIII metal catalyst systems which require biphyllic ligands e.g. triphenylphosphine, as essential components for the synthesis of anhydrides, the rhodium or iridium/iodide catalyst systems of the present anhydride forming processes may contain but do not require such biphyllic ligands. Halogen in excess of that present as ligands in the coordination compound may be used to quaternize the biphyllic ligands if present on the metal compound initially charged to the reactor. If preferred, the quaternary salts thus formed may then be removed from the reaction medium prior to the synthesis of carboxylic anhydrides as taught herein.

With those materials listed above as capable of providing the metal component which do not contain an iodine component it will be necessary to introduce into the reaction zone such an iodine component. For example, if the iridium component introduced is iridium metal or $Ir_2O_3$, it will be necessary to also introduce an iodide component such as ethyl iodide, hydrogen iodide, or the like.

As noted above, while the halogen component of the catalyst system may be in combined form with the rhodium or iridium as for instance, one or more ligands in a coordination compound, it is generally preferred to have an excess of an iodide-containing compound in the catalyst system as a promoting component. This promoting component of the catalyst system consists of an iodide-containing compound such as hydrogen iodide, alkyl or aryl iodide, metal iodide, ammonium iodide, phosphonium iodide, arsonium iodide, and the like. The halogen of the promoting component may be the same or different from that already present as ligands in the coordination compound of iridium. Accordingly, suitable iodine providing or promoting components may be selected from the following list of iodine and/or iodine-containing compounds.

RI where R = any alkyl- or aryl-group e.g., $C^2H^5I$
$I^2$
HI

where R = any alkyl- or aryl-group e.g.,

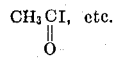

$R_4MI$,
$R_4MI_3$, where R = hydrogen or any alkyl or aryl
$R_3MI_2$ and M = N, P, As, or Sb It has been discovered that critical ratios of iodide to active metal catalyst, expressed as atoms of halide to atoms of metal atom exist. Within the range of these critical ratios, very reactive and selective carbonylation to carboxylic acid anhydrides occurs at milder temperatures and pressures than were heretofore possible.

The optimum critical ratios of iodine atoms to atoms of rhodium or iridium are in the range of 1:1 to 300:1 and preferably 4:1 to 100:1.

Outside the range of critical ratios of iodide to metal atoms, particularly at the higher iodide levels, the reaction efficiency and yield is drastically reduced. For example, at the higher halide levels, a significantly higher partial pressure of carbon monoxide is required for the reaction to proceed at an appreciable rate. Also, at the higher iodide levels, i.e., higher ratio of iodide to metal, the specificity to carboxylic acid anhydride product is significantly reduced and numerous oxygenated by-products such as ketones, lactones, aldehydes, etc., are formed.

The use of such low ratios of iodide to metal in contradistinction to the prior art, also simplifies the processing required, decreases handling of the expensive halide component and allows cheaper materials of construction, thus providing an improved, more economical, and commercially feasible process for the production of carboxylic acid anhydrides.

The exact nature of the optimum critical ratio of iodine to metal atom of the catalytic system has not been completely elucidated and may vary as a function of other reaction parameters including solvent composition, absolute concentration of catalyst components, e.g., metal and iodide constituents.

Generally, it is preferred that the process of the present invention be carried out in an acidic reaction medium. For purposes of the present invention, an acidic reaction medium is defined as one in which an alkyl iodide is present or will be formed. For example, when the feed is ethylene, the alkyl iodide will be the ethyl iodide. Such alkyl iodide may be added to the reaction medium as such or may be formed in situ within the reaction medium from the ethylene feed and the iodide present in the catalyst system. The reaction medium is considered acidic when under reaction conditions as herein set forth, at least 0.1 percent by weight of the total iodine in the system is present as the alkyl iodide. It is preferred, however, that at least 1.0 percent by weight of the total iodine in the system is present as the alkyl iodide.

The preparation of the active catalyst complex which includes both metal and iodide components may be accomplished by a variety of methods. In general, in the process of this invention, it is convenient to preform the active carbonylation catalyst system which contains both metal and iodide components. For example, to prepare the catalyst system, the metal component of the catalyst system, e.g., finely divided rhodium or iridium metal (powder) a simple rhodium or iridium salt or compound as a precursor is dissolved in a suitable medium, and carbon monoxide is bubbled through the above solution, preferably while maintaining gentle heating and stirring of the solution. Then a solution of the desired iodide promoter source is added to form an active catalytic solution containing the necessary metal and iodide promoter components.

The catalyst preserving or regenerating component of the catalyst system consists of hydrogen or a compound which generates hydrogen under the reaction conditions. Examples of compounds which generate hydrogen under the reaction conditions are sodium borohydride and hydrazine. This catalyst preserving or regenerating component may be employed in several ways. The component may be continually fed to the reactor during the course of the reaction. Alternatively, the catalyst returning to the reactor following separation of the product by, say, distillation, may be treated with the regenerating component of the catalyst system before being contacted with the reactants, namely carbon monoxide and the ethylenically unsaturated hydrocarbon. The catalyst preserving or regenerating component of the catalyst system can be employed at any reasonable level in the system but best results are obtained if the molar ratio of preserver or regenerator component to metal containing component is 5:1 to 10,000:1.

The ability of the preserver or regenerator component, namely hydrogen or a hydrogen-generating component to maintain or regenerate the activity of the rhodium or iridium catalysts is unique for the iodide promoted systems. Catalyst systems employing other halides, e.g., bromide or chloride, as promoters have been described in the prior art for carboxylic acid anhydride synthesis. However, it has been found in the present investigation that such systems have shown a tendency to rapidly deactivate and these systems could not be regenerated by use of hydrogen. Further, their activity could not be maintained by continually supplying hydrogen to the reaction.

The preservative and regenerative ability of hydrogen or hydrogen-generating substances as described herein has been found to be unique to rhodium and iridium systems and appears to be much less effective in preserving or regenerating the catalyst systems described in the prior art containing other metals which also are known to suffer from rapid deactivation under the conditions required for carboxylic acid anhydride sythesis.

The reason for the catalyst deactivation observed in systems for the synthesis of carboxylic acid anhydrides is unknown at this time, but in view of the well-known strongly reducing character of two of the principal reactants, namely carbon monoxide and ethylenically unsaturated compounds, it might logically be supposed that the deactivation process involves reduction of the active form of the metal catalysts; perhaps, to an inactive lower valence state or to the metal itself. In view of this, it was quite unexpected to find that the activity of the iodide promoted rhodium and iridium systems could be preserved by introduction of a component consisting of a strong reducing agent, namely hydrogen or a hydrogen producing substance. Further, it has been discovered that the full activity of systems which have suffered either partial or total deactivation can be regenerated by use of hydrogen or a compound capable of giving rise to hydrogen under the reaction conditions.

The catalyst system of the present invention is unique in comparison to earlier work in that it does not require the use of anhydrous or highly concentrated mineral acid solutions. Furthermore, the present catalyst system permits the use of halogen sources such as alkyl halides, e.g. ethyl iodide in place of the highly corrosive mineral acids such as concentrated HI. These factors serve greatly to reduce the corrosivity of the reaction system.

The present invention is based upon the production of carboxylic acid anhydrides by the reaction of ethylenically unsaturated compounds, carbon monoxide, and carboxylic acids or substances which yield carboxylic acids under the reaction conditions.

In accordance with the present invention, the carbonylation reaction may be carried out by intimately contacting olefins with gaseous carbon monoxide and carboxylic acids in a liquid phase containing the catalyst prepared from rhodium or iridium precursors; preferably in the presence of an iodide component and a catalyst preservative or regenerator component consisting essentially of hydrogen, under conditions of temperature and pressure suitable as described herein to form the anhydride product. The temperature accordingly is in the range of 50°C to 300°C. Partial pressures of carbon monoxide of the order of 1 psia to 2,000 psia may be employed; however, 25 psia to 500 psia carbon monoxide partial pressure is generally preferred. Higher pressures may be used if desired under appropriate conditions.

Alternatively, carboxylic acid anhydrides may be produced if desired via reaction of olefins with carbon monoxide and carboxylic acids in the vapor phase over the rhodium or iridium containing catalyst systems described above, dispersed upon solid supports. Such a catalyst may be operated as a conventional fixed bed catalytic reactor. For example, ethylene, ethyl iodide, carbon monoxide and propionic acid and a small amount of hydrogen may be passed over a catalyst system consisting, for example, of $[Rh(CO)_2I]_2$ dispersed on a solid support material such as alundum, activated carbon, clays, alumina, silica-alumina, and ceramics, etc., in a fixed bed reactor maintained at elevated temperature and pressure, as described above, to produce propionic anhydride in high yields. However, use of a liquid reaction medium is preferred in the process of this invention using dissolved or dispersed active catalytic and promoter components.

A typical carbonylation reaction selective to carboxylic acid anhydrides requires at least one mole of carbon monoxide, one mole of carboxylic acid, and one mole of ethylenically unsaturated component per mole of anhydride product. Excess of carbon monoxide, carboxylic acid, olefin, as discussed above over the aforesaid stoichiometric amounts, however, may be present. Carbon monoxide streams containing inert impurities such as carbon dioxide, methane, nitrogen, noble gases, and paraffinic hydrocarbons having from 1 to 4 carbon atoms, may be employed, if desired, for example, from an available plant gas stream, with no ill effect; however, in such cases total reactor pressure will have to be increased to maintain a desired carbon monoxide partial pressure. The concentration of carbon monoxide in the feed gas mixture is from 1 vol percent to 99.9 vol percent, a preferred range being from 10 vol percent to 99.9 vol percent.

The reaction rate is dependent upon catalyst concentration and temperature. Concentrations of the rhodium or iridium compound or the first component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or iodide portion of the catalyst system may vary over the broad concentration range of $10^{-6}$ moles/liter to 10 moles/liter, based on iodide atoms. In the process of this invention, however, the preferred critical range of ratios of iodide atoms to metal atoms is maintained as discussed herein to achieve the superior results.

The active catalyst component is preferably supplied as a catalyst solution. The solution can also include liquid reactants, products and mixtures thereof which function as solvents or reaction media.

The present invention may be practiced with or without the employment of an added solvent. Certain of the examples show the use of excess carboxylic acid as a solvent in the reaction, while other examples show the use of decalin and methyl naphthalene as solvents of equivalent utility. However the employment of solvents, such as the aforesaid decalin or methyl naphthalene is not claimed as a part of the present invention. The use of a solvent, which preferably boils at a higher temperature than the desired carboxylic acid anhydride product, gives certain processing advantages e.g., more complete product separation upon distillation.

The halide promoted rhodium and iridium catalysts of the present invention are characterized by a high degree of specificity for the carboxylation reaction to anhydrides. Such control over the various competing reactions to obtain the carboxylic acid anhydride in very high yield selectively is surprising since other Group VIII metal catalysts promoted by halides do not show such specificity. Other Group VIII metal catalysts containing high concentrations of halide promoter, e.g., iron, cobalt, nickel, with high halide levels, differ from the present catalysts in that they also produce a number of oxygenated products such as alcohols, aldehydes, lactones, esters, and ketones in addition to the carboxylic acid anhydrides.

For a better understanding of the processes of the present invention specific embodiments of the process are presented below. These examples and illustrations are not to be construed in any way as limiting the scope of the invention.

EXAMPLE 1

A batch reactor provided with a stirrer is charged with the following ingredients: 0.1 grams ($5 \times 10^{-4}$ moles) of a rhodium compound having the formula $Rh_2O_3 \cdot 5H_2O$ as catalyst precursor, 5.5 grams ($3.5 \times 10^{-2}$ moles) of a promoter component consisting of ethyl iodide; and 100 ml of propionic acid as reactant; the olefin feed, ethylene is charged to the reactor as a 1:1 molar mixture with carbon monoxide. The ratio of I/Rh is 70:1.

The reactor is pressurized with the gas blend to a total pressure of 700 psig [p. press (partial pressure) of CO about 250 psi] at 175°C. The reaction is carried out at a constant pressure by feeding the gas blend upon demand, from a high pressure reservoir.

The reaction initiates at a rate of 5.7 gram-moles/liter-hour (g-m/l-hr) but the reaction rate slows down rapidly so that after 65 minutes the reaction rate is less than 2 percent of that initially ( <0.1 g-m/l-hr) indicating deactivation of the rhodium catalyst while the anhydride synthesis is proceeding.

A liquid sample is removed from the reactor and the reaction mixture subsequently analyzed by a gas chromatographic (GC) technique yields a solution containing:

10.2 wt percent propionic anhydride
87.0 wt percent propionic acid

The productivity to propionic anhydride during the 65 minutes reaction time is 11.3 grams or 105 grams/liter-hr.

Hydrogen is then added to the reactor such that it represents 5 percent of the gas above the reacting liquid (35 psi partial pressure $H_2$ in a total reactor pressure of 700 psi). The reaction rate increases by over 5,000 percent to a rate of 5.2 g-m/l-hr, essentially that of the initial rate. This indicates regeneration of the rhodium/iodide catalyst system probably through reformation of the initially highly catalytically active rhodium species.

After a total reaction time of 130 minutes (65 minutes with the added $H_2$) the GC (gas chromatography) analysis of a liquid sample yields a solution containing:

42.0 wt percent propionic anhydride
54.8 wt percent propionic acid.

The productivity to propionic anhydride during the 65 minutes with the added hydrogen as the third component of the catalyst system is 40.5 grams or 375 grams/liter-hour. The large increases in both productivity and reaction rate clearly demonstrate the process improvement through employing hydrogen as a catalyst system component for the synthesis of carboxylic acid anhydrides along with the rhodium and iodide components.

The selectivity to propionic anhydride is greater than 99 percent based on propionic acid, carbon monoxide and ethylene. Even though hydrogen is employed no other organic oxygenated compounds such as alcohols, aldehydes, ketones, lactones, etc. are produced from the olefin feed as determined by gas chromatographic analysis. No substantial amounts of other undesirable by-products such as methane, ethane, carbon dioxide or higher olefin derivatives and/or higher anhydrides are formed. It is surprising that no significant quantities of hydrogenated or hydroformulated products are produced in the presence of hydrogen for the rhodium/iodide catalyst system. Other rhodium containing compounds (i.e. $[Rh(CO)_2Cl]_2$) in the absence of an iodide promoter synthesize major quantities of paraffins, aldehydes, and alcohols from olefins, carbon monoxide and hydrogen.

Other forms of the three components essentially comprising the catalyst system initially charged to the reactor give similar results, e.g., as rhodium precursors $Rh_2(CO)_4I_2$; $Rh[C_6H_5)_3P]_2(CO)I$; and $RhI_3$, as iodide promoter HI; 2-iodooctane; and $I_2$: as hydrogen generating components, sodium borohydride or hydrazine.

Other Group VIII noble metals such as palladium complexed with biphyllic ligands (e.g., triphenylphosphine) have been reported to synthesize carboxylic acid anhydrides. When Example 1 is repeated except employing 0.1 g $PdCl_2$ and 0.6 g triphenylphosphine as the components of the catalyst system no propionic anhydride is observed in the reaction product after two hours. The major product is a polymeric solid which appears to be a polyketone. Adding hydrogen (p.pressure hydrogen 100 psi) as a third component to the palladium-triphenylphosphine catalyst system eliminates the formation of the polymeric solid. However after 5 hours the reaction product does not contain any propionic anhydride and the palladium is found to have been reduced by the hydrogen to insoluble palladium metal.

Nickel as nickel carbonyl or substances which give rise to carbonyls under the conditions of the reaction (e.g., nickel propionate) have also been reported to catalyze the synthesis of anhydrides but at very severe reaction conditions (e.g., up to 300°C and 10,000 psig of carbon monoxide). When nickel propionate is used as the metal catalyst component under similar conditions to Example 1 (175°C and total reactor pressure of 700 psig) no propionic anhydride is observed by gas chromatographic analysis of a liquid sample removed from the reactor after 65 minutes. Fifty psi of hydrogen (about 7 percent by volume) is then added to the vapor space above the reaction liquid. In contradistinction to the results of Example 1 for rhodium, no reaction rate enhancement occurs which appears to indicate no regeneration of the nickel carbonyl catalyst system. After 130 minutes (15 minutes with hydrogen) the reaction is terminated. While a small quantity of propionic anhydride or acid appears in the GC analysis, the molar quantity is less than the number of moles of nickel charged to the reactor. Hence, in contradistinction to the results of Example 1 for rhodium, the anhydride-forming reaction is not catalytic in the metal component (i.e., nickel) in this experiment.

In this and subsequent examples reaction rates and conversion have been maintained at moderate levels in order to more clearly demonstrate the concepts of this patent.

EXAMPLE 2

This example demonstrates that the concept of use of added hydrogen as a preserving or regenerating component for synthesis of carboxylic acid anhydrides from olefins, carbon monoxide and carboxylic acids (or substances which generate carboxylic acids under reaction conditions) applies also to the iridium/iodide catalyst system.

A batch reactor is charged with the following ingredients: 0.31 grams ($5 \times 10^{-4}$ moles) of an iridium component having the formula $IrI_3 \cdot 3H_2O$ as catalyst precursor, 0.23 grams ($1.5 \times 10^{-3}$ moles) of a promoter component consisting of ethyl iodide; 30 ml of 1-methyl naphthalene as solvent, and 70 ml of propionic acid as reactant; the olefin feed, ethylene is charged to the reactor as a 1:1 molar mixture with carbon monoxide. The ratio of I/Ir is 6:1.

The reactor is pressurized with the gas blend to a total pressure of 600 psig (p.press of CO about 150 psi) at 175°C. The reaction is carried out at constant pressure by feeding the gas blend upon demand, from a high pressure reservoir.

The reaction initiates rapidly but then drops off to a rate of 0.5 gram-mole/liter-hour (g-m/l-hr). After 1 hour the reaction rate slowed further to 0.3 g-m/l-hr. A liquid sample is removed from the reactor and the reaction mixture subsequently analyzed by gas chromatographic (GC) technique yields a solution containing:

2.4 wt percent propionic anhydride
70.8 wt percent propionic acid
26.0 wt percent methyl naphthalene solvent The productivity to propionic anhydride during this hour is 2.6 grams or 26 grams/liter-hour.

Hydrogen is then added to the reactor such that it represents 1.7 percent of the gas above the reacting liquid (10 psi partial pressure $H_2$ in a total reactor pressure of 600 psi). The reaction rate increases by over 700 percent to a rate of 2.3 g-m/l-hr. The rapid reaction rate thus achieved indicates regeneration of the iridium species to the original very highly catalytically active forms for carboxylic acid anhydride synthesis after hydrogen addition.

After a total reaction time of 160 minutes (100 minutes with the added $H_2$) the GC analysis of a liquid sample yields a solution containing 35.5 wt percent propionic anhydride
41.1 wt percent propionic acid
21.5 wt percent methyl naphthalene solvent The productivity to propionic anhydride during the 100 minutes with the added hydrogen is 39.8 grams or 240 grams/liter-hour, almost 10 times the productivity attained in the 60 minutes before hydrogen addition. Therefore, not only does the hydrogen component of the catalyst system regenerate to highly catalytically active forms of Ir/I complexes but also preserves the catalyst in this highly active state during extended reaction times.

The selectivity to propionic anhydride is greater than 99% based on propionic acid and carbon monoxide and greater than 98% based on ethylene. Even though hydrogen is employed no other organic oxygenated compounds such as alcohols, aldehydes, ketones, lactones, etc. are produced from the olefin feed as determined by gas chromatographic analysis. No substantial amounts of other undesirable by-products such as methane, ethane, carbon dioxide or higher olefin derivatives and/or higher anhydrides are formed. It is surprising that no significant quantities of hydrogenated or hydroformylated products are produced in the presence of hydrogen for the iridium iodide catalyst system. Other iridium containing compounds, e.g., $[HIr[(C_6H_5)_3P]_3 \cdot (CO)]$ in the absence of iodide promoters, synthesize major quantities of paraffins, aldehydes and alcohols from olefins, carbon monoxide and hydrogen. Other forms of the three components essentially comprising the catalyst system initially charged to the reactor give similar results (e.g. as iridium precursor $Ir[(C_6H_5)_3P]_2(CO)I$, $Ir_2O_3$, $Ir_4(CO)_{12}$, etc., as iodide promoter HI, 2-iodooctane, $I_2$, etc; as hydrogen generating component sodium borohydride, hydrazine, etc.)

EXAMPLE 3

The process improvement of employing a three component catalyst system (e.g., rhodium or iridium compound, iodide component and hydrogen) also applies after the catalyst system has been recycled. The reaction liquid product from Example 2 is distilled to remove the product propionic anhydride and unreacted propionic acid. The 30 ml liquid residue containing the high boiling methyl naphthalene solvent and dissolved iridium is recycled to the batch reactor of Example 2. To this residue is added 70 ml propionic acid reactant and 0.23 grams ($1.5 \times 10^{-3}$ moles) of ethyl iodide. Operating conditions are the same as in Example 2.

The reaction initiated at a rate of 0.7 gram-moles/liter hour (g-m/l-hr). After 30 minutes the reaction rate is still 0.7 g-m/l-hr. Hydrogen is then added to the reactor such that it represents 10 percent of the gas above the reacting liquid (60 psi partial pressure $H_2$ in a total reactor pressure of 600 psi).

The reaction rate increases by over 190 percent to a rate of 1.35 g-m/l hr. After a total reaction time of 92 minutes (65 minutes with the added $H_2$) the GC analysis of a liquid sample yields a solution containing:

28.8 wt percent propionic anhydride
51.7 wt percent propionic acid
18.3 wt percent methyl naphthalene solvent The productivity to propionic anhydride during the 92 minutes is 31.7 grams or 205 grams/liter-hour.

While the above example employs a batch reactor and discontinuous hydrogen addition, the process improvement is achieved for continuous processing in which a reactor is operated continuously, the product liquid stream removed, distilled to separate product anhydride from an iridium containing recycle which is continuously returned to the reactor. The hydrogen is maintained as a low percentage of the feed gases to the reaction (e.g., for propionic anhydride, ethylene and carbon monoxide) which are also continuously added to the reactor.

Through the use of the hydrogen component of the catalyst system added to the feed gas a highly active form of the metal complex is preserved for many recycles without loss of activity. Without the hydrogen component the useful life of the metal halide catalyst system is reduced probably through the formation of less active catalyst species. After only a few recycles little synthesis of propionic anhydride is achieved. This deactivation is reversible as introduction of the hydrogen component with the feed gas will regenerate the highly active form of the iridium or rhodium/iodide complexes.

Without the use of hydrogen it would be necessary to remove catalyst from the recycle stream often for regeneration by decomposing and reforming the highly active form of the catalyst external to the reactor.

EXAMPLE 4

While chloride, bromide or iodide serve as promoters for the synthesis of propionic acid and anhydride employing rhodium or iridium compounds as the catalyst precursors, the example shown below demonstrates that unexpectedly the process improvement of using hydrogen as a third component of the catalyst system applies uniquely for iodide. It is found that hydrogen in conjunction with the rhodium or iridium halide catalyst systems promoted by chloride or bromide does not preserve or regenerate highly active catalyst forms for propionic anhydride synthesis.

Example 1 is repeated at the same halide to metal ratio except that the iodide is replaced by bromide (i.e., the bromide to rhodium ratio is 70:1).

The reaction initiates at a rate of 2.1 gram-moles/liter hour (g-m/l-hr). After 90 minutes the reaction rate slows to 0.6 g-m/1-hr. A liquid sample is removed from the reactor and the reaction mixture subsequently analyzed by a gas chromatographic (GC) technique yields a solution containing:

- 22.4 wt percent propionic anhydride
- 72.5 wt percent propionic acid.

The productivity to propionic anhydride during the 90 minutes is 26 grams or 173 grams/liter-hour.

Hydrogen is then added in three increments over the next 175 minutes such that the hydrogen represents 2.8 to 31 percent of the gas above the reacting liquid (20 to 300 psi partial pressure of $H_2$). No increase in reaction rate indicating regeneration is observed at any of the hydrogen levels. After a total reaction time of 265 minutes (175 minutes with the added $H_2$) the GC analysis of a liquid sample yields a solution containing:

- 27.1 wt percent propionic anhydride
- 65.9 wt percent propionic acid

The productivity to propionic anhydride during the 175 minutes with the added hydrogen is 4.7 grams or 16 grams/liter-hour.

Similarly when bromide is employed but with iridium as the metal component of the catalyst system no regeneration occurs when hydrogen is added. When the bromide promoter is replaced by chloride with either rhodium or iridium compounds as the catalyst precursor no preserving of or regeneration to highly active catalyst forms is observed upon adding hydrogen to the gas above the reacting liquid in the stirred reactor.

EXAMPLE 5

A batch reactor is charged with the following ingredients: 0.30 grams ($7.5 \times 10^{-4}$ moles) of an iridium compound having the formula $IrCl \cdot 3H_2O$ as catalyst precursor, 3.1 grams ($1.15 \times 10^{-2}$ moles) of a promoter component consisting of 2-iodooctane; 77 ml tridecanoic acid and 82 ml of isomerized dodecenes as reactants. The ratio of I/Ir is 15:1. 1.

The reactor is pressured to a total pressure of 400 psig with carbon monoxide at 185°C. The reaction is carried out at constant pressure by feeding CO upon demand from a high pressure reservoir.

The reaction initiates at a rate of 4.6 g-m/l-hr. A total of 4.5 ml water is added over a reaction time of 133 minutes. The reaction continues to form tridecanoic acid from the dodecenes until the water has all been consumed. After the water is consumed, a small quantity of tridecanoic acid anhydride (<2 grams) is synthesized but the reaction stops as indicated by lack of uptake of carbon monoxide.

Hydrogen is then added to the reactor such that it represents 20 percent of the gas above the reacting liquid (100 psi partial pressure $H_2$). The reaction rate sharply increases to 3.5 g-m/l-hr indicating regeneration and after 28 minutes with the added hydrogen 18.7 gram of tridecanoic acid anhydride are formed for a productivity of over 250 grams/liter-hour.

This result demonstrates that the concept of hydrogen as a preserving and regenerating component applies to the transformation of other ethylenically unsaturated feedstocks (e.g., dodecene) to carboxylic acid anhydrides. Similar high reactivity and selectivity to carboxylic acid anhydrides is achieved as for ethylene to propionic anhydride.

The concept is broadly applicable to other ethylenically unsaturated feedstocks regardless of chain length and structure (double bond position and degree of branching).

EXAMPLE 6

This example demonstrates the use of a different olefin from that combined in the carboxylic acid with the subsequent conversion to the anhydride of both the olefin and the carboxylic acid and the mixed anhydride. More particularly it demonstrates the use of added hydrogen for the synthesis of acetic-propionic anhydride, which is transformed into acetic anhydride and propionic anhydride, at high reactivity and selectively from ethylene, acetic acid and carbon monoxide.

Example 1 is repeated except that the 100 ml of propionic acid reactant is replaced by 100 ml acetic acid. After 1 hour the reaction rate is 0.2 g-m/l-hr. Upon addition of 5 vol. percent hydrogen (5 percent) the reaction rate increases to over 4 g-m/l-hr. indicating regeneration. After 2 hours the reaction is terminated and GC analysis of the liquid reaction product shows 22 wt percent propionic anhydride, 18 percent acetic anhydride and a significant quantity of the mixed acetic-propionic anhydride ($CH_3COOCOC_2H_5$).

EXAMPLE 7

There is a significant difference in hydrogen as a preserving and regenerating component for rhodium or iridium and iodide between the synthesis of carboxylic acids and carboxylic acid anhydrides. In synthesizing carboxylic acids, water is employed as a reactant while for anhydride production carboxylic acids (or substances which yield carboxylic acids under reaction conditions) replaces water as the reactant. With water present in the reacting solution, no improvement in reaction rate is observed when hydrogen is added. Apparently the presence of water maintains the rhodium or iridium/iodide catalyst in the form of its high activity complexes. In contradistinction, in the synthesis of carboxylic acid anhydrides the reaction rate slows down during synthesis probably through formation of less active rhodium or iridium complexes. Addition of the hydrogen component regenerates these complexes to more active forms and thus produces a more rapid synthesis. and longer catalyst life for anhydride production.

To demonstrate this difference between carboxylic acid and anhydride production Example 1 is repeated but water is continuously pumped to the reactor such that the water content is maintained at 3 wt percent in the liquid solution. Reaction rate to formation of propionic acid is constant at 12 grams-moles liter-hr for 60 minutes. In Example 1 without the water in which anhydride is synthesized the reaction rate decreases by over 5000 percent from 5 g-m/l-hr to <0.1 g-m/l-hr. in a similar time period.

Hydrogen is then added to the gas at the 5% level while the reactor still has 3 wt percent water. No increase in reaction rate occurs, whereas when hydrogen is added, in Example 1, the hydrogen component increases the reaction rate over 50 fold from 0.1 g-m/l-hr to 5.2 g-m/l-hr.

EXAMPLE 8

A solid supported catalyst containing an iridium component and an iodide component dispersed upon a solid support is prepared in the following manner: an amount of 0.725 g of iridium triiodide trihydrate having the formula $IrI_3 \cdot 3H_2O$ is dissolved in 115 ml of ethanol. The solution is warmed to 60°C, and carbon monoxide is bubbled through the solution until a pale yellow color is obtained indicating the presence of the monovalent complex. Subsequently, the resulting solution is cooled and is added to 20 ml of an activated carbon (Pittsburgh Activated Carbon Company). The excess solvent is evaporated using a rotary evaporator under vacuum. The resulting catalyst is vacuum dried at 60°C for about 16 hours. The catalyst is then preheated in nitrogen at 200°C for one hour.

To effect a vapor phase reaction, ten (10) ml of the above supported catalyst is charged into an 18-inch stainless steel vertical reactor 30 mm in diameter. The resulting catalyst bed, 2 cm in depth, is covered with 100 ml of inert packing as a preheater. Gaseous ethylene is supplied to the reactor and is subsequently converted to propionic anhydride at high selectivity. The process is conducted at a feed rate (moles per hour) of ethylene, 0.27; ethyl iodide 0.001; propionic acid, 0.28; carbon monoxide 0.54; and hydrogen 0.05. The pressure at which the reactants contact the supported catalyst is 500 psia and a hydrogen partial pressure of 15 psia at a reaction temperature of 175°C.

The reactor effluent contains the desired carboxylic acid anhydride product, propionic anhydride, and unreacted ethylene, propionic acid, carbon monoxide, hydrogen and promoter. The selectivity of ethylene conversion to propionic anhydride is virtually quantitative.

The addition of hydrogen preserves the catalyst in its highly active catalyst form and allows long term operation of the reactor. Without addition of hydrogen to the feed gases, rapid slow down in production of anhydride occurs requiring reactor shut down and separate regeneration of the catalyst such as by addition of water.

EXAMPLE 9

This example demonstrates the concept of regenerating less active catalyst species formed during carboxylic acid anhydride synthesis to its more highly catalytically forms by staged operation. After separation of the propionic anhydride product from the high boiling solvent containing the iridium or rhodium for recycle, the recycle solution is fed to a reactor feeding water as one of the reactants (reactor 1) rather than returning it to the propionic anhydride forming reactor (reactor 2). Reactor 1 in which water is fed produces propionic acid which in turn may be used either as the acid itself or fed to reactor 2 as reactant for propionic anhydride production. The benefit achieved by recycling the iridium or rhodium catalyst system to the reactor in which carboxylic acid is produced is that any less catalytically active species generated in reactor 2 are converted to the highly catalysticaly active form by water in reactor 1.

The reaction liquid from Example 2 is distilled to remove the product propionic anhydride and unreacted propionic acid. The 30 ml liquid residue containing the high boiling methyl napthalene solvent and dissolved iridium is recycled to the batch reactor of Example 2. Instead of just adding 70 ml propionic acid reactant and 0.23 grams ($1.5 \times 10^{-3}$ moles) of ethyl iodide as in Example 2, 3 ml of water is also fed. Operating conditions are the same as in Example 2.

A very rapid formation of propionic acid occurs (>10 g-m/l-hr) until all the water is consumed at which reaction time propionic anhydride is produced at a rate of 2.2 g-m/l hr. This high reaction rate shows that less active forms of iridium generated during the anhydride synthesis prior to recycle or distillation have been reactivated in the first portion of the reaction by the water.

While in this example only one batch reactor is employed, two or more reactors operated in stages may be employed with the reccycle from the anhydride reactor being returned to the carboxylic acid forming stages. The reactors may also be operated continuously with water added, for example, to the recycle stream.

EXAMPLE 10

A batch reactor is charged with the following ingredients: 0.31 grams ($5 \times 10^{-4}$ moles) of an iridium component having the formula $IrI_3 \cdot 3H_2O$ as catalyst precursor, 0.12 grams ($0.75 \times 10^{-3}$ moles) of a promoter component consisting of ethyl iodide; 30 ml of decalin (decahydronaphthalene) as solvent, and 65 ml of propionic acid as reactant; the olefin feed, ethylene is charged to the reactor as a 1:1 molar mixture with carbon monoxide. The ratio of I/Ir is 4.5:1.

The reactor is pressurized with the gas blend to a total pressure of 700 psig (p.press of CO about 200 psi) at 175°C. The reaction is carried out at constant pressure by feeding the gas blend upon demand, from a high pressure reservoir.

The reaction initiates rapidly but then drops off to a rate of 0.4 gram-mole/liter-hour (g-m/l-hr). After 52 minutes the reaction rate slowed further to 0.1 g-m/l-hr. A liquid sample is removed from the reactor and the reaction mixture subsequently analyzed by gas chromatographic (GC) technique yields a solution containing:

<1.0 wt percent propionic anhydride
72.8 wt percent propionic acid
26.4 wt percent decalin solvent The productivity to propionic anhydride during this hour is less than 1 gram or less than 12 grams/liter-hour.

Hydrogen is then added to the reactor such that it represents 1.5 percent of the gas above the reacting liquid (10 psi partial pressure $H_2$ in a total reactor pressure of 700 psi). The reaction rate increases by over 3000 percent to a rate of 3.0 g-m/l-hr. The rapid reaction rate thus achieved indicates regeneration of the iridium species to the original very highly catalytically active forms for carboxylic acid anhydride synthesis after hydrogen additon.

After a total reaction time of 208 minutes (156 minutes with the added $H_2$) the GC analysis of a liquid sample yields a solution containing:

37.4 wt percent propionic anhydride
38.5 wt. percent propionic acid
23.0 wt percent decalin solvent The productivity to propionic anhydride during the 156 minutes with the added hydrogen is 43.2 grams or 175 grams/liter-hour more than 10 times the productivity attained in the 52 minutes before hydrogen addition. Therefore, not only does the hydrogen component of the catalyst system regenerate to highly catalytically active forms of Ir/I complexes but also preserves the catalyst in this highly active state during extended reaction times.

The selectivity to propionic anhydride is greater than 99% based on pripionic acid and carbon monoxide and greater than 98% based on ethylene. Even though hydrogen is employed no other organic oxygenated compounds such as alcohols, aldehydes, ketones, lactones, etc. are produced from the olefin feed as determined by gas chromatographic analysis. No substantial amounts of other undesirable by-products such as methane, ethane, carbon dioxide or higher olefin derivatives and/or higher anhydrides are formed. It is surprising that no significant quantities of hydrogenated or hydroformylated products are produced in the presence of hydrogen for the iridium iodide catalyst system.

This example demonstrates that equivalent results to those of Example 2 are obtained replacing methyl naphthalene with decalin as a high boiling solvent. As in Example 2 very highly catalytically active forms are regenerated upon hydrogen addition. Other solvent such as high boiling paraffins may also be employed to give certain processing advantages in the synthesis of carboxylic acid anhydrides from olefins, carbon monoxide and carboxylic acids or substances which generate carboxylic acids under reaction conditions.

What is claimed is:

1. An improved process for the production of carboxylic acid anhydrides by the reaction of ethylenically unsaturated feedstock compounds having from 2 to 30 carbon atoms, which comprises contacting the said compound with carbon monoxide, and at least one reactant selected from the group consisting of carboxylic acids having from 2 to 30 carbon atoms and water, at a temperature from 50°C to 300°C and a partial pressure of carbon monoxide of 1 psia to 2,000 psia, the improvement comprising the production of carboxylic acid anhydrides in the presence of a catalyst system consisting essentially of:
   1. a rhodium or iridium compound, and
   2. an iodide component subject to the conditions that the atomic ratio of iodide to rhodium or iridium is from 1:1 to 300:1, and
   3. hydrogen as a catalyst preserver or regenerator component in a molar ratio of 5:1 to 10,000:1 to the rhodium or iridium with the proviso that when the process is conducted in the presence of both carboxylic acids having from 2 to 30 carbon atoms and water as reactants, the ratio of moles of water fed to the reactor per mole of carbon monoxide consumed is less than 0.5, and that when the reactant of the group of carboxylic acids and water, is water, the ratio of moles of water fed to the reactor per mole of carbon monoxide consumed is at least 0.5 but less than 1.0.

2. Process as in claim 1 in which the reactants of the group of carboxylic acids and water are carboxylic acids having from 2 to 30 carbon atoms.

3. An improved process for the production of carboxylic acid anhydrides by the reaction of ethylenically unsaturated compounds having from 2 to 30 carbon atoms, which comprises contacting the said compound with carbon monoxide and at least one reactant selected from the group consisting of carboxylic acids having from 2 to 30 carbon atoms, and water at a temperature from 50°C to 300°C and a partial pressure of carbon monoxide of 1 psia to 2,000 psia, the improvement comprising the production of carboxylic acid anhydrides in the presence of a catalyst system consisting essentially of:
   1. rhodium or iridium compound, and
   2. an iodide component subject to the condition that the atomic ratio of iodide to rhodium or iridium is from 4:1 to 100:1, and
   3. hydrogen as a catalyst preserver or regenerator component in a molar ratio of 5:1 to 10,000:1 to the rhodium or iridium with the proviso that when the process is conducted in the presence of both carboxylic acids having from 2 to 30 carbon atoms and water as reactants, the ratio of moles of water fed to the reactor per mole of carbon monoxide consumed is less than 0.5, and that when the reactant of the group of carboxylic acids and water, is water, the ratio of moles of water fed to the reactor per mole of carbon monoxide consumed is at least 0.5 but less than 1.0.

4. Process as in claim 1 in which the said rhodium compound is a rhodium halide.

5. Process as in claim 1 in which the said iridium compound is an iridium halide.

6. Process as in claim 1 in which the said iodide component is an alkyl iodide having from 1 to 20 carbon atoms.

7. Process as in claim 1 in which the said ethylenically unsaturated compound is ethylene and the reactant of the group of carboxylic acids and water is acetic acid, and the products are comprised of propionic anhydride, acetic anhydride, and acetic-propionic anhydride.

8. Process as in claim 1 in which the said ethylenically unsaturated compound is ethylene and the reactant of the group of carboxylic acids and water is propionic acid, and the product is comprised of propionic anhydride.

9. Process as in claim 1 in which the rhodium or iridium component, and at least part of the iodide promoter are dispersed on a solid support, and the process is conducted by passing the ethylenically unsaturated compounds, carbon monoxide, hydrogen, and at least one reactant selected from the group of carboxylic acids and water, all in the vapor phase, over the said solid phase catalyst system.

10. Process as in claim 12 in which at least a portion of the iodide promoter is also in the vapor phase.

* * * * *